March 22, 1949. A. D. SINDEN 2,465,287
CONVEYER
Filed July 15, 1947 5 Sheets-Sheet 1

INVENTOR.
Alfred De Los Sinden
BY
J. Stanley Churchill
ATTORNEY

March 22, 1949.　　　A. D. SINDEN　　　2,465,287
CONVEYER

Filed July 15, 1947　　　5 Sheets-Sheet 2

INVENTOR.
Alfred DeLos Sinden
BY
J. Stanley Churchill
ATTORNEY

March 22, 1949.  A. D. SINDEN  2,465,287
CONVEYER
Filed July 15, 1947  5 Sheets-Sheet 4

INVENTOR.
Alfred DeLos Sinden
BY
J. Stanly Churchill.
ATTORNEY

Patented Mar. 22, 1949

2,465,287

UNITED STATES PATENT OFFICE 2,465,287

CONVEYER

Alfred Delos Sinden, Aurora, Ill., assignor to Redler Conveyor Company, Quincy, Mass., a corporation of Massachusetts Application July 15, 1947, Serial No. 761,120

6 Claims. (Cl. 198—168)

This invention relates to a conveyor for conveying flowable solid material.

In general, the object of the invention is to provide a novel and superior construction of conveyor of the type comprising an elongated casing and a conveying element having a series of spaced flights arranged to be drawn through the casing to effect the conveyance of solid flowable material from an inlet in the casing to an outlet therefrom. The present conveyor is characterized particularly by the relationship of the size of conveyor flight to the casing whereby during the operation of the conveyor the casing is provided with a stationary lining of the material being conveyed which has the effect of eliminating excessive wear on the interior of the casing due to corrosion and abrasion.

With this general object in view, and such others as may hereinafter appear, the invention consists in the conveyor and in the various structures, arrangements and combinations of parts hereinafter described and particularly defined in the claims at the end of this specification.

In the drawings illustrating the preferred embodiment of the invention.

Prior to the present invention, one general type of conveyor which has been used extensively for the conveyance of various forms of flowable solid material has comprised a casing having an inlet and an outlet and through which a conveyor element has been drawn to effect the conveyance of material through the casing. The conveyor elements have taken various forms being characterized by the provision of flights spaced apart and distributed at regular intervals along the conveyor element and of a size slightly less than the interior sectional dimensions of the casing thereby providing a normal clearance between the flights and the casing. The flights have taken the form of either open flights or of so-called closed flights, the latter comprising flight plates usually disposed transversely to the axis of the conveyor casing, and in both of these specific types of conveyor substantial difficulty has been experienced in practice because of the wear on the interior of the casing produced by the corrosive and abrasive action of certain materials being conveyed.

An example of the difficulties heretofore experienced with these types of conveyors is well illustrated in the handling of coal. It has been found that the steel casing walls become coated with rust during shut-down periods, resulting from the moisture and slight acidity in the coal, and when the conveyor is started up the rust is quickly scoured off by the movement of the body of coal as it is moved through the casing by the conveying element. The fact that heretofore the flights have been separated from the casing by a small clearance causes an abrasive action to take place by the rubbing of the moving layer of material against the casing. As a result the item of maintenance of casings in coal handling installations has become exceedingly serious. In attempting to solve the problem hardened steel liners have been proposed but these rust as readily as plain steel and all economical rust-proof coatings which have been applied to the interior of the steel is rapidly scoured off by the movement of the coal in the operation of the conveyor.

The result has been that prior to the present invention no satisfactory solution has been found to the problem.

In accordance with the present invention, the scouring and abrasive action upon the interior of the conveyor casing of the coal or other material being conveyed through the conveyor is prevented by so regulating the size of the flights with relation to the sectional dimension of the conveyor casing that in the operation of the conveyor a stationary lining of the coal or other material itself is formed between the marginal portions of the conveyor flights and the surrounding interior portions of the conveyor casing. It has been found that whereas the standard clearances heretofore employed have been of the order of magnitude of one-quarter to one-half an inch, depending upon the casing size, it is desirable to increase these clearances many times so that during the operation of the conveyor the conveyor flights are pulled through and form in effect a tunnel in a body of the material being conveyed so that wear occurs between the flights and the stationary lining which is thus produced for the conveyor casing. In conveyors thus constructed, it has been found practicable to coat the interior of the casing with a corrosion resisting paint or other coating, and after extensive use and operation of the conveyor it has been found that the rust-proof coating remains completely intact due to the fact that the ordinarily experienced scouring action has been completely eliminated.

Figures 1, 2, 3, 4:
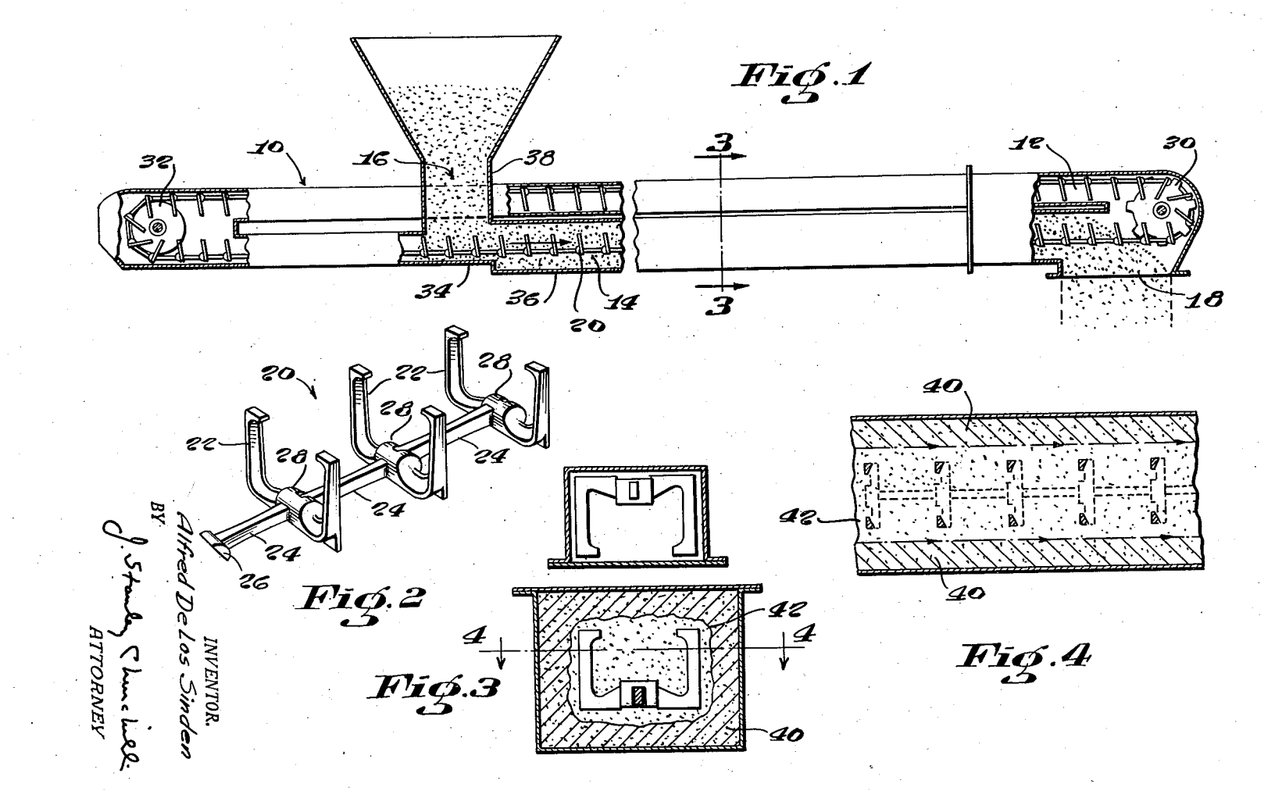
Fig. 1 is a side elevation, partly in cross section, of a conveyor of the horizontal type embodying the present invention.
Fig. 2 is a perspective view of a portion of the preferred conveying element embodied in the present conveyor.
Fig. 3 is a transverse sectional view taken on the line 3—3 of Fig. 1.
Fig. 4 is a plan view detail in cross section taken on the line 4—4 of Fig. 3.

Referring now to the drawings, and particularly to Fig. 1, the conveyor therein illustrated is of the horizontal type provided with a casing, indicated generally at 10, having an upper or idle run 12 and a lower or working run 14. The casing is provided with an inlet 16 communicating with the lower run 14 adjacent one end of the casing, and a discharge outlet 18 is disposed adjacent the other end of the conveyor.

The flowable solid material introduced into the casing through the inlet 16 is conveyed through the casing by an endless conveying element indicated generally at 20 and which comprises a plurality of pivotally and detachably connected flight members 22, of open and preferably of a generally U-shaped construction disposed transversely of the conveyor. As better shown in Fig. 2, each flight member is herein shown as provided with a tension link 24 formed integrally therewith having an enlargement 26 at one end which is arranged to be received within a slotted and hollow hub 28 formed upon the opposite end of an adjacent flight member.

The conveying element 20 is arranged to be drawn through the casing 10 by a driving sprocket 30 disposed at one end of the conveyor and which may be rotated in any usual or preferred manner, not shown, and, the conveying element is arranged to run over an idler wheel 32 disposed at the other end of the conveyor.

As herein illustrated, the inlet 16 of the conveyor communicates with a section 34 of the working run which is of normal or usual internal area relative to the size of the flight passing therethrough, that is, the outside dimensions of the open flight members substantially fill the entire cross sectional area of the casing with a relatively small and preferably the standard clearance on all sides. In accordance with the present invention, the section 36 of the working run immediately adjacent the section communicating with the inlet is abruptly increased in internal area, the casing being enlarged on all four sides a substantial distance beyond the outside dimensions of the conveying flights and the increased internal area is maintained uniformly for the remainder of the working run extending to the discharge outlet 18. As set forth above, the abnormal clearance thus provided at least equals that minimum clearance between the flights and casing required to form a substantially stationary body of the material being conveyed between the flights and the casing during operation. The upper run 12 of the casing may and preferably will be of normal size for guiding the conveying element from the driving sprocket 30 to the idler wheel 32. It will be observed that the section 34 is of normal size from the idler wheel or tail unit of the conveyor and is maintained at normal size across the mouth of the inlet 16 terminating at the further end wall 38 of the inlet, whereupon the casing is abruptly enlarged in size as above described.

With this construction it will be seen that in the operation of the conveyor, assuming the casing to be empty, the flowable solid material introduced through the inlet 16 will be carried into the enlarged section 36 of the working run and the latter will be gradually and progressively filled with the material so that material subsequently introduced at the inlet 16 will be pulled through the surrounding material and discharged through the outlet 18. It has been found in practice that after a short while the surrounding flowable solid material becomes firmly packed around the interior walls of the enlarged casing section forming a lining or hollow shell 40 having an opening 42, more or less irregular in out-line, through which subsequently deposited material is conveyed to be discharged through the outlet. It will be observed that the size of the opening 42 although irregular in form approximates the size of the section 34, as shown in Fig. 4, and has substantially the same internal area throughout so that in practice, the subsequently deposited material is conveyed in a solid column or continuous mass in accordance with the Redler principle of conveying as disclosed in the reissue patent to Redler No. Re. 18,445, April 26, 1932. As above set forth, in operation, there is no movement of the material in direct contact with the steel or metal walls of the enlarged section of the casing so that abrasive action against the interior walls thereof is entirely eliminated. It has further been found in practice that a rust preventative such as a bituminous coating or lead paint applied to the interior walls of the casing is not scratched off and will endure for relatively long periods of time thus substantially increasing the casing life.

Figures 5, 6, 7, 8:
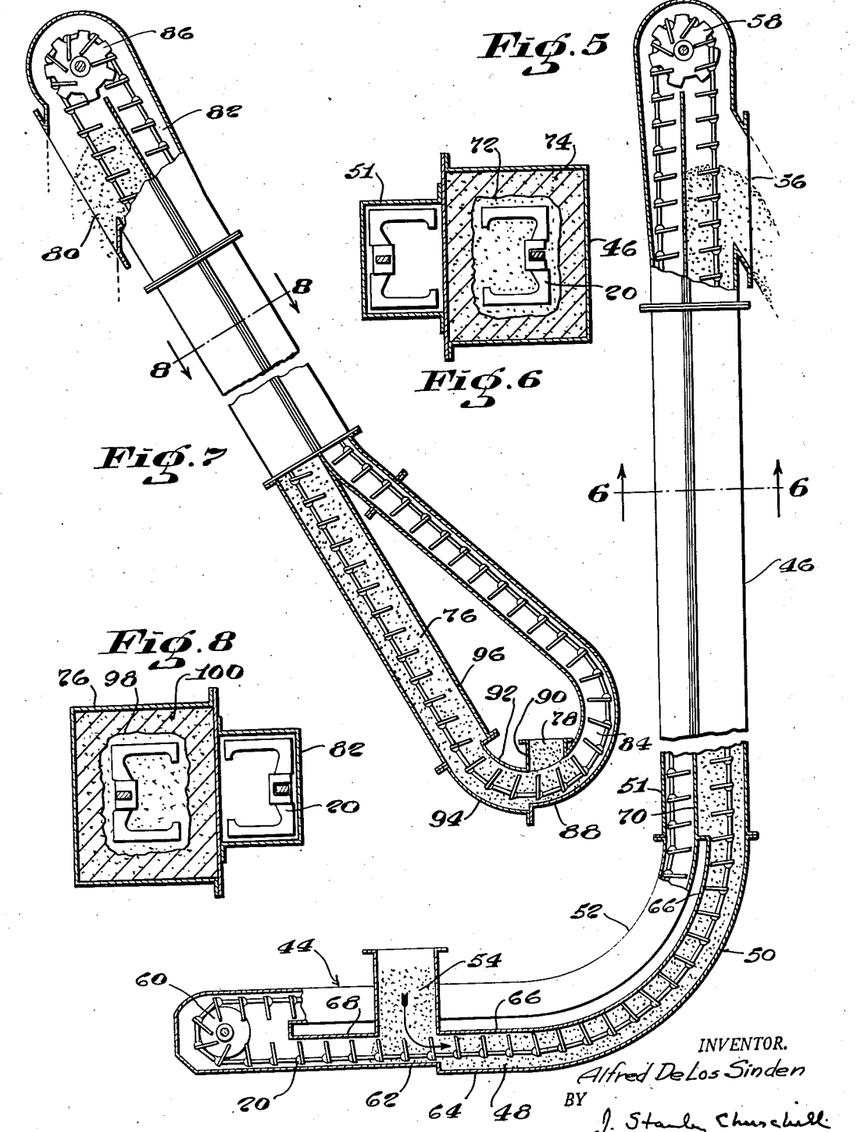
Fig. 5 is a side elevation, partly in cross section, of an L-type conveyor having a horizontal leg and a vertical elevating leg embodying the present invention.
Fig. 6 is a cross sectional view taken on the line 6—6 of Fig. 5.
Fig. 7 is a side elevation, partly in cross section, of a loop boot conveyor-elevator embodying the present invention.
Fig. 8 is a cross sectional view taken on the line 8—8 of Fig. 7.

Referring now to Fig. 5 the conveyor therein illustrated comprises a so-called L-type elevating conveyor having a horizontal leg 44 and a vertical leg 46 and provided with a working run 48 extending along the lower portion of the horizontal leg, around a bend 50, and then vertically to the upper end of the vertical leg 46, the return run 51 extending from the upper end of the vertical leg around a short bend 52, and then horizontally along the upper portion of the horizontal leg 44. The conveyor is further provided with an inlet 54 communicating with the lower portion of the horizontal leg 44, and, an outlet 56 disposed at the upper end of the vertical leg 46 as illustrated. The conveying element 20 may and preferably will be of the same type as that illustrated in Fig. 2, heretofore described, and is arranged to be drawn through the casing by a driving sprocket 58 disposed at the upper end of the vertical leg 46. The conveying element is arranged to run from the driving sprocket 58 through the return run 51 and over an idler wheel 60 disposed at the outer end of the horizontal leg 44.

In the embodiment of the invention illustrated in Fig. 5, the inlet 54 communicates with a section 62 of the casing which is of normal internal area providing the standard relatively small clearances for the conveying element 20 and, immediately beyond the inlet section 62 the next adjacent section 64 is abruptly enlarged in internal area on three sides the casing being increased in depth and width to at least the critical minimum clearance above referred to, to wit one which provides the desired stationary lining of material for the casing. The upper wall 66 is preferably maintained in alignment with the upper wall 68 of the normal size section 62 along the horizontal portion of the conveyor, and around the bend 50 in order to properly guide the conveying element around the curved portion of the working run of the casing.

Beyond the curved portion 50 the casing is further increased in internal area, the casing wall 70 being abruptly enlarged beyond the guide wall 66, the remaining side walls being maintained at their originally increased dimensions so that the vertical working run between the curved portion 50 and the discharge outlet 56 the casing is enlarged on all four sides. Thus, in practice, the material being conveyed will first gradually and progressively fill the working run of the casing and subsequently deposited material will be carried through the opening 72 formed in the surrounding material 74 by the conveying element 20, as illustrated in Fig. 6, and will be discharged through the outlet 56. The surrounding shell of material 74 thus forms a lining for the steel or metal casing providing efficient protection against abrasive wear and undue corrosion of the interior walls of the casing. The return run 51 extending downwardly beyond the head sprocket 58 around the short bend 52 to the tail wheel 60 may and preferably will be of normal size to guide the conveying element back to the working run 48.

The conveyor illustrated in Fig. 7 embodies the present invention in a loop boot elevator type of conveyor which may be vertically or angularly extended as shown and which is provided with a working run 76 extending from an inlet 78 at the lower end of the conveyor to an outlet 80 at the upper end. A return run 82 extends downwardly substantially parallel to the working run for a portion of its length and then assumes the form of a loop or curved portion 84 extending to the inlet 78 and communicating with the working run 76. The conveying element 20 is arranged to be drawn through the casing by a head sprocket 86 disposed at the upper end of the conveyor beyond the discharge outlet 80, the conveying element being guided from the return run 82 to the working run 76 by the loop portion 84 of the conveyor, as illustrated.

As herein shown, the inlet 78 is disposed in the loop portion of the casing and communicates with a portion 88 thereof which is of normal size having the usual small clearance around the conveying element for moving the material in a solid column. Immediately beyond the inlet 78 or commencing with the end wall 90 of the inlet the conveyor is increased in internal area, the casing being abruptly enlarged in depth and width to provide the critical clearance above referred to and the upper wall 92 remaining coextensive with the upper wall of the communicating portion of the return run. The casing is continued in these proportions until it traverses a short bend portion 94 of the working run and thereafter the casing is further enlarged beyond the bend wall 92, as indicated at 96 so that the portion of the working run extending between the bend 94 and the discharge outlet 80 is increased in internal area on all four sides, as illustrated in Fig. 8 above the crictical clearance above referred to. Thus, in practice, the material being conveyed is fed to the working run in a normal stream, that is in a volume having a cross sectional area corresponding to the normal size casing at the inlet and, in operation, the working run between the inlet and the outlet is gradually and progressively filled with the material so that subsequently introduced material is carried through an opening 98 formed in the surrounding material 100, the cross sectional area of the opening corresponding substantially to the cross sectional area of the portion 88 communicating with the inlet 78. The surrounding shell 100 of the material thus forms a protective lining in the working run whereby wear from abrasion is entirely eliminated and corrosive action is effectively retarded.

Figures 9, 10:
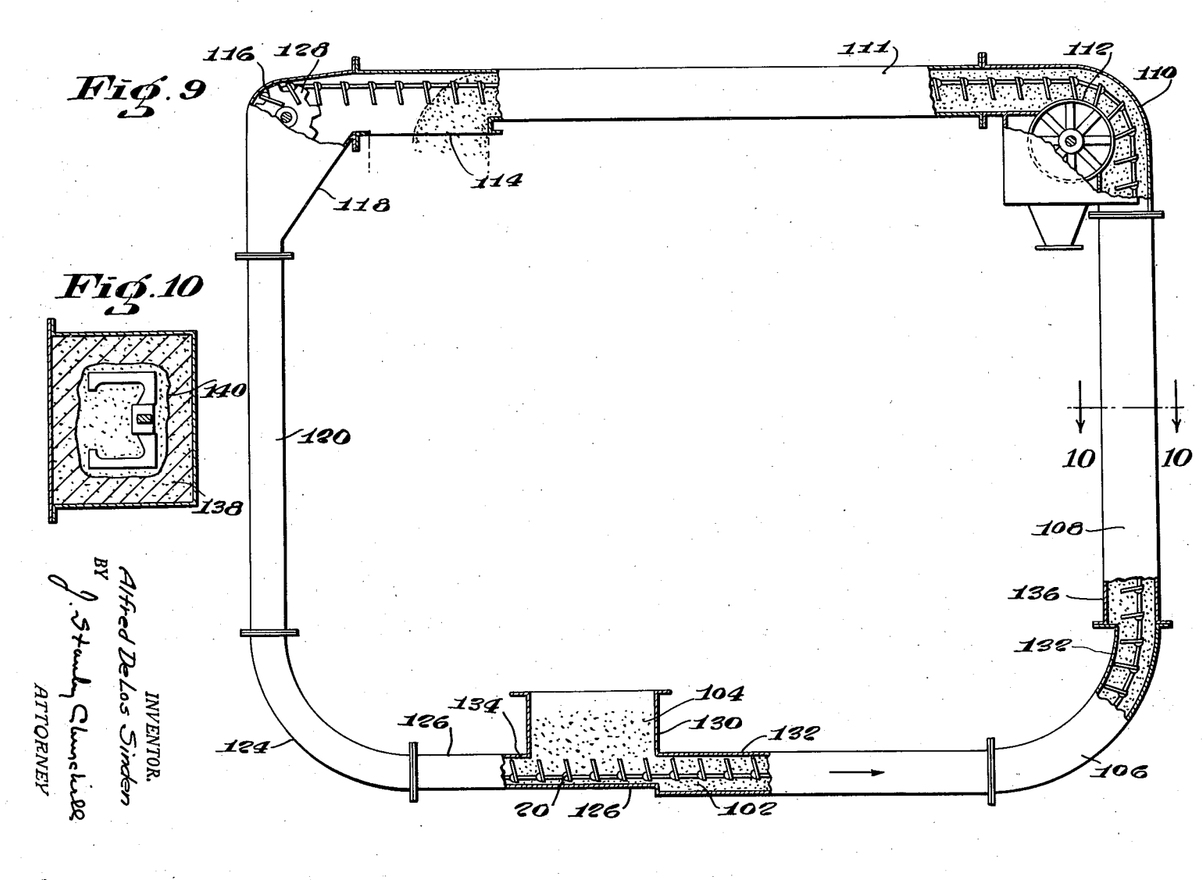
Fig. 9 is a view in side elevation and partly in cross section of a closed circuit conveyor-elevator embodying the present invention.
Fig. 10 is a cross sectional view taken on the line 10—10 of Fig. 9.

Fig. 9 illustrates the invention as embodied in a so-called "run-around" or closed circuit conveyor elevator which extends in an upright and generally rectangular path and which is capable of recirculating material back to the feed point when the discharge outlet is closed off or reduced in size. As herein shown, the closed circuit conveyor-elevator comprises a casing extending through a rectangular path and having a working run including a section 102 extending from an inlet 104 in the lower horizontal leg, around a corner bend 106 and vertically through a section 108 up to and around an upper corner bend 110 provided with a sealing drum 112 capable of permitting the material to be carried around the bend 110 and into the upper horizontal leg 111. The material in the upper horizontal leg is carried to a discharge outlet 114 formed therein. When the discharge outlet 114 is closed off or reduced in size the surplus material may by pass the second upper corner bend 116 through a guide chute 118 communicating with the vertical leg 120 of the return run. The return run extends downwardly around a lower bend 124 and into the portion 126 of the lower horizontal leg of the conveyor, the by passed material being thus carried back to the inlet point.

The conveying element 20 is arranged to be drawn through the rectangular casing by a driving sprocket 128 disposed in the upper left hand bend portion 116 being guided through the casing by the bend portions 124, 106 and over the sealing drum 112, as described.

In the operation of the conveyor illustrated in Fig. 9, as in the previously described embodiments, the inlet 104 is disposed in the lower run of the conveyor and is arranged to communicate with the end of section 126 which is of normal dimensions relative to the conveying element 20, and, the section 102 of the casing immediately beyond the inlet, and beginning with the end wall 130 thereof is abruptly enlarged on three sides, the upper wall 132 remaining coextensive with the upper wall 134 of the normal size casing until it traverses the bend 106 at which point the casing is further enlarged beyond the wall 132, as indicated at 136, forming a part of the section 108 so that the casing is substantially increased in internal area relative to the conveying element and at least above the critical point above referred to, in all four sides between the bend 106 and the corner bend 110. In passing through the corner bend 110, the conveying element 20 engages the sealing drum 112 for guiding purposes thus reducing the internal area somewhat adjacent the inner edge of the conveying element. Immediately beyond the sealing drum, the upper horizontal leg 111 again assumes the enlarged proportions relative to the conveying element, the cross sectional area being the same as the cross sectional area of section 108.

Thus, in operation, the material introduced at the inlet 104 will fill the working run and form a protective lining 138 therein having an opening 140 through which subsequently deposited material will be drawn in a mass and discharged at the outlet 114. In the event that the outlet 114 is closed off or reduced in size the surplus material may be recirculated through the return run, as described. The return run including the sections 120, 124, 126 may and preferably will be of normal size relative to the conveying element for conveying the material in a solid column.

Figures 11, 12:
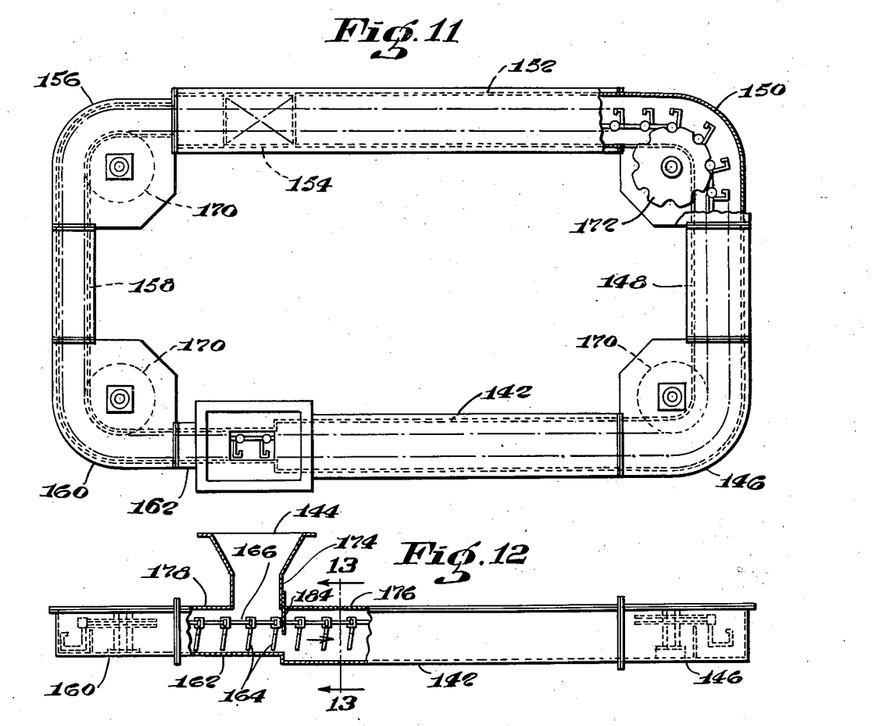
Figs. 11 and 12 are plan and side elevations respectively, partly in cross section of a closed circuit horizontal conveyor embodying the present invention.

Referring now to Fig. 11, the present invention is therein illustrated as embodied in a closed circuit horizontal conveyor which extends in a substantially horizontal and generally rectangular path and which is capable of recirculating the material back to the feed point when the discharge outlet is closed off or reduced in size. As herein shown, the horizontal recirculating conveyor comprises a casing having a working run including a section 142 extending from an inlet 144, around a corner bend 146 through a communicating section 148 at right angles to the section 142 and thence around a corner bend 150 through a section 152 parallel to the section 142 and in which the discharge outlet 154 may be disposed. In the illustrated embodiment of the invention, the working run terminates a short distance beyond the discharge outlet and communicates with the return run which extends through a corner bend 156, intermediate section 158 and corner bend 160 communicating with a short section 162 leading to the inlet 144.

Figure 13:
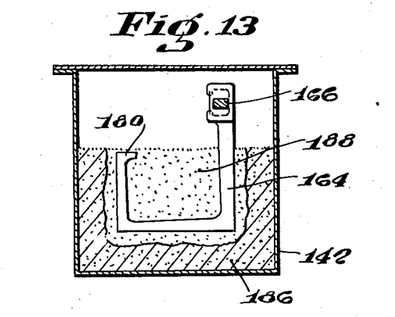
Fig. 13 is a cross sectional view taken on the line 13—13 of Fig. 12.
Figure 14:
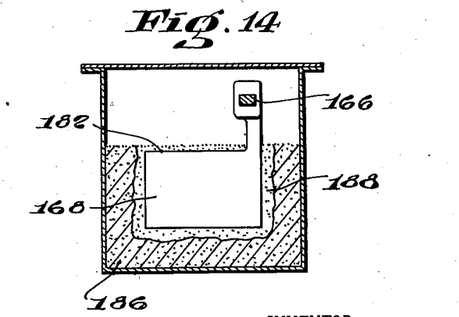
Fig. 14 is a view similar to Fig. 13 but illustrating a solid type of flight for the conveying element.

The conveying element employed in the conveyor illustrated in Figs. 11 and 12 may comprise a series of connected U-shaped side pull flights 164 of open structure as shown in Fig. 13 having the connecting portions 166 extended above the normal level of the material in the casing, or, the conveying element may comprise solid or closed flight members 168 as shown in Fig. 14 and, in either event the conveying element is guided over idler sprockets 170 at the corner bends 146, 156, 160 and is arranged to be driven by a sprocket 172 disposed at the corner bend 150.

As herein shown, the inlet 144 communicates with the short section 162 comprising the end of the return run and which is of standard dimensions relative to the conveying element. Immediately beyond the inlet and beginning with the end wall 174 thereof the casing is abruptly enlarged on three sides to provide the critical minimum clearance above referred to, the upper wall 176 remaining coextensive with the upper wall 178 of the return run casing. The casing maintains its enlarged dimensions throughout the working run thereof extending through the section 142, corner bend 146, section 148, corner bend 150 and section 152 to a point immediately beyond the discharge outlet 154 whereupon the casing is abruptly reduced in size on three sides to its normal dimensions relative to the conveying flight and maintains its normal dimensions throughout the return run up to and including the short section 162 communicating with the inlet 144.

In a conveyor embodying a side pull conveying element the height of the material in the casing is maintained at a short distance above the shorter leg 180 of the open flight member 164 or above the upper edge 182 of the closed flight member 168 so that the connecting links 166 extend above the material at all times, and this height may be regulated by an adjustable plate 184 attached to and forming an extension of the end wall 174 of the inlet. The upper walls or cover members 176, 178 for the working and return runs respectively may thus remain coextensive or in the same horizontal plane throughout.

Thus, in the operation of the horizontal closed circuit conveyor embodying the present invention, the material introduced at the inlet 144 will fill the working run and form a protective lining 186 therein having an opening 188 therein through which subsequently deposited material will be drawn in a mass and discharged at the outlet 154, and, in the event that the outlet is closed off or reduced in size the surplus material will be recirculated through the return run, as described.

Figure 15:
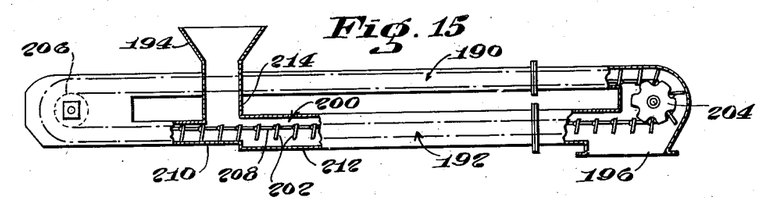
Fig. 15 is a side elevation partly in cross section of a modified form of horizontal conveyor utilizing solid flights for the conveying element.

Fig. 15 illustrates a modification of the horizontal type conveyor, shown in Fig. 1, adapted for the embodiment of solid or closed flight conveying elements, and, as herein shown, comprises a casing having an idle or upper run 190 and a lower or working run 192. The casing is provided with an inlet 194 communicating with the lower run 192 and disposed at one end of the casing, and, a discharge outlet 196 disposed at the other end of the conveyor. The material introduced into the casing through the inlet 194 is conveyed through the casing by an endless conveying element indicated generally at 200 and which comprises a series of connected flight members 202 generally rectangular in shape of solid or closed construction and disposed transversely of the casing. The conveying element 200 is arranged to be drawn through the casing by a driving sprocket 204 disposed at one end of the conveyor and is guided over an idler sprocket 206 at the other end of the conveyor. It will be observed that the solid flights 202 extend outwardly from the connecting links 208 to permit passage around the sprockets.

The inlet 194 communicates with a section 210 of the working run which is of normal internal area relative to the size of the flight passing therethrough. The section 212 of the working run immediately adjacent the inlet and beginning at the end wall 214 thereof is abruptly increased in internal area, being enlarged on all four sides a substantial distance beyond the outside dimensions of the conveying flights, to provide at least the critical minimum clearance above referred to and, the increased size is maintained for the remainder of the working run to the discharge outlet 196. The upper run of the casing may be of normal size for guiding the conveying element from the driving sprocket to the idler wheel, the section 210 from the idler being also maintained at normal size across the mouth of the inlet and terminating at the further end wall 214 where the casing is abruptly enlarged.

Figure 19:
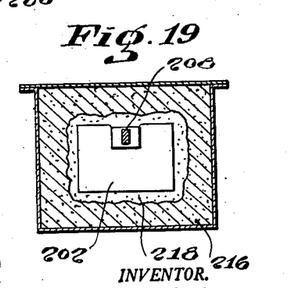
Fig. 19 is a typical transverse cross section through the casings of the conveyors illustrated in Figs. 15 to 18 inclusive embodying the solid type of flights.

In the operation of the conveyor shown in Fig. 15 the working run will be gradually and progressively filled with material introduced at the inlet so that material subsequently introduced will be conveyed through the surrounding material and discharged through the outlet 196. As shown in Fig. 19, the surrounding material forms a stationary shell or lining 216 having an opening 218 through which the material is conveyed.

Figures 16, 17:
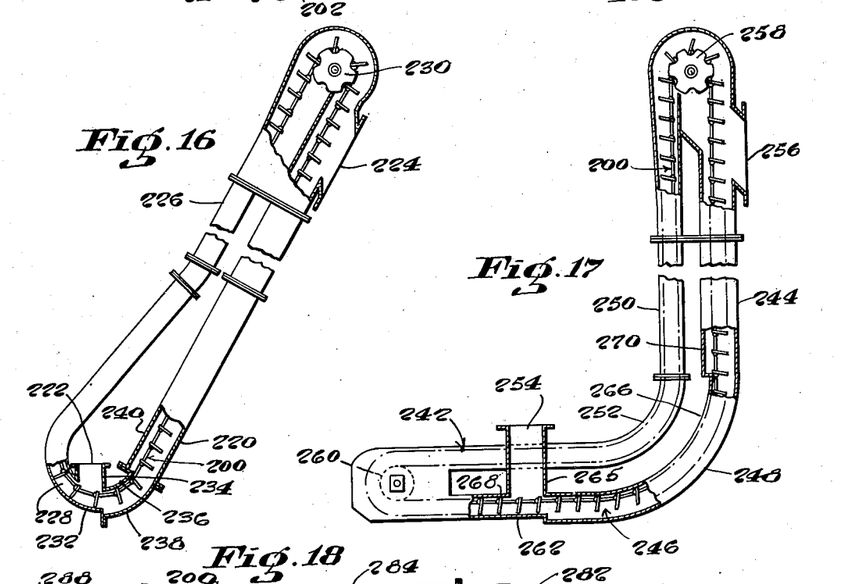
Fig. 16 is a side elevation partly in cross section of a modified form of loop boot conveyor embodying solid flights.
Fig. 17 is a side elevation partly in cross section of a modified form of an L-type conveyor-elevator employing solid flights.

The conveyor illustrated in Fig. 16 comprises a modification, embodying solid flights, of the loop boot elevator conveyor shown in Fig. 7, and is provided with a working run 220 extending from an inlet 222 disposed in the loop portion of the casing to an outlet 224 disposed at the upper end thereof. The return run 226 extends downwardly substantially parallel to the working run for a portion of its length and then passing into the loop portion 228 as shown. The conveying element 200, similar to that shown in Fig. 15, is arranged to be drawn through the casing by a head sprocket 230 disposed at the upper end of the conveyor beyond the discharge outlet and is guided from the return run to the working run by the loop portion as illustrated.

The inlet 222 communicates with a portion 232 of the loop, which is of normal size having the usual small clearances around the conveying element. Immediately beyond the inlet 222 or commencing with the end wall 234 thereof, the conveyor is increased in internal area, being abruptly enlarged in depth and width to provide at least the critical minimum above referred to, the upper wall 236 remaining coextensive with the upper wall of the communicating portion of the return run. The casing is continued in these proportions until it traverses a short bend portion 238 of the working run and thereafter the casing is further enlarged beyond the bend wall 236, as indicated at 240 so that the portion of the working run extending between the bend 238 and the discharge outlet 224 is increased in internal area on all four sides, as illustrated in Fig. 19, which comprises a typical cross section through the working run of all the conveyors embodying solid flights, illustrated in Figs. 15, 16, 17 and 18. Thus, in practice, the material being conveyed is fed to the working run in a normal stream and the latter is gradually filled so that subsequently introduced material is carried through the opening 218 formed in the stationary lining of surrounding material 216, illustrated in the typical cross-section of Fig. 19.

Referring now to Fig. 17, the conveyor therein illustrated comprises a modified form of the L-type elevating conveyor shown in Fig. 5 and adapted for the use of a solid flight conveying element 200. As herein shown, the conveyor is provided with a horizontal leg 242 and a vertical leg 244 and is provided with a working run 246 extending along the lower portion of the horizontal leg, around a bend 248, and then vertically to the upper end of the vertical leg 244. The return run 250 extends from the upper end of the vertical leg, around a short bend 252, and then horizontally along the upper portion of the horizontal leg 242. The inlet 254 communicates with the lower portion of the horizontal leg 242, and is provided with an outlet 256 disposed at the upper end of the vertical leg. The conveying element 200 is arranged to be drawn through the conveyor by a sprocket 258 and is guided through the horizontal leg by an idler wheel 260.

In accordance with the present invention, the inlet 254 communicates with a section 262 which is of normal internal area, and immediately beyond the inlet section 262 the next adjacent section 246, commencing at the end wall 265 of the inlet, the casing is abruptly enlarged in internal area on three sides, the casing being increased in depth and width to provide the critical minimum clearance above referred to. The upper wall 266 is preferably maintained in alignment with the upper wall 268 of the section 262 along the horizontal portion of the conveyor, and around the bend 248 in order to guide the conveying element around the bend. Beyond the bend, the casing is further increased in internal area, the casing wall 270 being abruptly enlarged beyond the guide wall 266, so that the vertical working run between the bend 248 and the outlet 256 of the casing is enlarged on all four sides. Thus, in operation, the material being conveyed will first fill the working run so that subsequently deposited material will be carried through the opening 218 formed in the stationary surrounding material 216 by the conveying element 200, to be discharged through the outlet 256.

Figure 18:
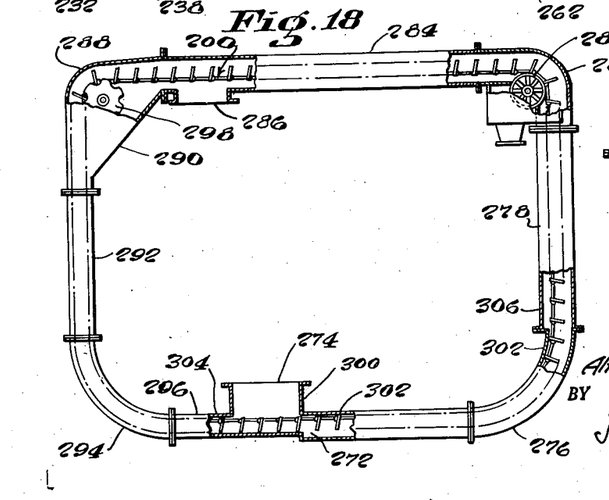
Fig. 18 is a side elevation partly in cross section of a modified form of closed circuit elevator conveyor embodying solid flights.

The conveyor illustrated in Fig. 18 comprises a modified form of the closed circuit elevator conveyor shown in Fig. 9, and is designed to embody a solid flight conveying element 200. As herein shown, the modified form of closed circuit conveyor elevator comprises a casing extending through a rectangular path and having a working run including a section 272 extending from an inlet 274 in the lower horizontal leg, around a corner bend 276 and vertically through a section 278 up to and around an upper corner bend 280 provided with a sealing drum 282 adapted to permit the material to be carried around the bend 280 and into the upper horizontal leg 284, the latter being provided with a discharge outlet 286. When the outlet 286 is closed off or reduced in size surplus material may by-pass the second upper corner bend 288 through a guide chute 290 communicating with the vertical leg 292 of the return run. The return run continues around a lower bend portion 294, and into the portion 296 of the lower horizontal leg. The conveying element is arranged to be drawn through the casing by a driving sprocket 298 disposed in the corner bend 288 and is guided through the casing by the bend portions 294, 276 and over the sealing drum 282.

The inlet 274 is disposed in the lower run of the conveyor and is arranged to communicate with the end of section 296 which is of normal dimensions relative to the conveying element 200, and, the section 272 immediately beyond the inlet and beginning with the end wall 300 thereof is abruptly enlarged on three sides to provide the critical minimum clearance as above referred to, the upper wall 302 remaining coextensive with the upper wall 304 of section 296 until it traverses the bend 276 at which point the casing is further enlarged beyond the wall 302, as indicated at 306 so that the casing is substantially increased in internal area relative to the conveying element on all four sides between the bend 276 and the corner bend 280. In passing through the corner bend 280, the conveying element 200 engages the sealing drum 282 for guiding purposes thus reducing the internal area somewhat adjacent the inner edge of the conveyor, and, immediately beyond the sealing drum, the upper horizontal leg 284 again assumes the enlarged proportions relative to the conveying element, the cross sectional area being the same as the cross sectional area of section 278. Thus, in operation, the material introduced at the inlet 274 will fill the working run and form a protective lining 216 therein having an opening 218 through which subsequently deposited material will be conveyed, as illustrated in the typical section shown in Fig. 19.

As above set forth, the standard clearances between each side of the flights of the conveyor casing and the adjacent wall which have heretofore been employed in practice in the design and commercial operation of conveyors of the type forming the subject matter of the present invention have been of the order of magnitude of from one-quarter to one-half an inch. I have found that in order to provide the desired stationary body of material between the periphery of the flights and the casing, it is desirable that the clearance should be approximately double the maximum size of lump occurring in the major portion of the material to be conveyed. The amount of clearance therefor is made to depend upon such a maximum, and while theoretically clearances upwards of four inches between each side of the flight and the adjacent wall of the casing operate successfully as far as the formation of the stationary lining of the material is concerned, nevertheless cost considerations indicate that the size of the present conveyor is limited to one wherein the clearances vary from one to four inches between each side of the flight and the adjacent wall of the conveyor casing. In other words, in a conveyor of the type described embodying the present invention, the conveyor casing will be from two inches to eight inches wider and deeper than the flights.

It will be understood from an inspection of the drawings that in those forms of the invention which may be regarded as elevators and wherein the working run of the conveyor is disposed at an angle to the horizontal greater than the angle of repose of the material being conveyed, the clearance required to provide the desired stationary layer of material occurs between all of the effective marginal edges of the flights and the walls of the casing; whereas, in the case of the horizontally disposed conveyors and those disposed at an angle less than the angle of repose of the material, it is required that only the two side edges and the bottom of the flights be spaced from the interior walls of the casing to provide the necessary clearance.

While a conveyor embodying the present invention finds particular use in successfully handling boiler house coal wherein the maximum lump size of a major portion of the coal varies from one and one-half inches to two inches, with an occasional lump of greater size and with a large proportion of a size less than such maximums, utilizing the aforesaid clearances of from one to four inches, it is to be understood that the present conveyor may be used with advantage in conveying other materials having average maximum lump sizes of from one-half to two inches.

Having thus described the invention, what is claimed is:

1. A conveyor for conveying flowable solid material having an average maximum lump size of between one and one-half and two inches comprising an elongated casing, an endless open-flight conveying element disposed in and adapted to be drawn through the casing to effect the conveyance of the flowable material therethrough, said conveying element having spaced flights disposed transversely of the casing and of a size with relation thereto to provide a clearance between the flights and the interior of the casing of from one to four inches whereby during the operation of the conveyor there is formed a stationary layer of the material being conveyed between the marginal portions of the flights and the casing.

2. A conveyor for conveying flowable solid material comprising a casing having an inlet defined in part by an end wall and an outlet, and an endless open-flight conveying element traversable through the casing and provided with a plurality of spaced flights of open structure to effect the conveyance of material therethrough, said casing being of a size to be substantially filled by said flights at the portion communicating with said inlet for conveying the material in a mass, said casing being abruptly and substantially increased in internal area relative to said flights from the end wall of said inlet in the direction of travel of said conveying element and extending to said outlet, the increased proportions of the casing being such that the clearance between the casing and outer margins of the flights is not less than one inch and at least double the average maximum size lump occurring in the major portion of the material being conveyed, whereby the material itself will form a stationary lining in the enlarged portion of the casing and the conveying element will form an opening in the surrounding material through which subsequent material fed from said inlet portion of the casing will be conveyed in a mass.

3. A conveyor for conveying flowable solid material, comprising: an elongated casing, and an endless conveying element disposed in and adapted to be drawn through the casing to effect the conveyance of the flowable material therethrough, said conveying element having spaced flights disposed transversely of the casing and of a size with relation thereto to provide a clearance between the effective marginal portions of the flights and the interior of the casing of from one to four inches, whereby during the operation of the conveyor there is formed a stationary layer of the material being conveyed between said marginal portions of the flights and the casing.

4. A conveyor for conveying flowable solid material, comprising: an elongated casing, and an endless open-flight conveying element disposed in and adapted to be drawn through the casing to effect the conveyance of the flowable material therethrough, said conveying element having spaced flights disposed transversely of the casing and of a size with relation thereto to provide a clearance between the outer edges of the flights and the interior of the casing of not less than one inch and at least double the average maximum size lump occuring in the major portion of the material being conveyed, whereby during the operation of the conveyor there is formed a stationary layer of the material being conveyed between the flights and the casing.

5. A conveyor for conveying flowable solid material, comprising: an elongated casing inclined to the hoizontal on an angle greater than the angle of repose of the material to be conveyed, and an endless open-flight conveying element disposed in and adapted to be drawn through the casing to effect the conveyance of the flowable material therethrough, said conveying element having spaced flights disposed transversely of the casing and of a size with relation thereto to provide a clearance between the effective marginal edges of the flights and the interior of the casing of not less than one inch and at least double the average maximum size lump occurring in the major portion of the material being conveyed, whereby during the operation of the conveyor there is formed a stationary layer of the material being conveyed between the marginal portions of the flights and the casing.

6. A conveyor for conveying flowable solid material, comprising: an elongated casing disposed to the horizontal on an angle less than the angle of repose of the material to be conveyed, and an endless open-flight conveying element disposed in and adapted to be drawn through the casing to effect the conveyance of the flowable material therethrough, said conveying element having spaced flights disposed transversely of the casing and of a size with relation thereto to provide a clearance between the two side edges and the bottom of the flights and the interior of the casing of not less than one inch and at least double the average maximum size lump occurring in the major portion of the material being conveyed, whereby during the operation of the conveyor there is formed a stationary layer of the material being conveyed between the flights and the casing.

ALFRED DELOS SINDEN.

REFERENCES CITED

The following references are of record in the file of this patent:

UNITED STATES PATENTS

| Number | Name | Date |
| --- | --- | --- |
| 2,303,584 | Schweickart | Dec. 1, 1942 |
| 2,304,603 | Schroeder | Dec. 8, 1942 |

OTHER REFERENCES

Stephenson-Adamson Catalog 140, Aurora, Illinois, 1940.